United States Patent
Lenox

(10) Patent No.: US 8,294,022 B2
(45) Date of Patent: Oct. 23, 2012

(54) PHOTOVOLTAIC ARRAY WITH MINIMALLY PENETRATING ROOFTOP SUPPORT SYSTEM

(75) Inventor: Carl J. S. Lenox, Oakland, CA (US)

(73) Assignee: SunPower Corporation, San Jose, CA (US)

(*) Notice: Subject to any disclaimer, the term of this patent is extended or adjusted under 35 U.S.C. 154(b) by 652 days.

(21) Appl. No.: 12/416,358

(22) Filed: Apr. 1, 2009

(65) Prior Publication Data

US 2010/0252092 A1 Oct. 7, 2010

(51) Int. Cl.
H01L 31/0203 (2006.01)

(52) U.S. Cl. ........ 136/246; 136/259; 136/244; 257/431; 257/433

(58) Field of Classification Search .................. 136/243, 136/244
See application file for complete search history.

(56) References Cited

U.S. PATENT DOCUMENTS

| | | | |
|---|---|---|---|
| 4,223,667 A | 9/1980 | Paymal | |
| 4,371,139 A | 2/1983 | Clark | |
| 5,232,518 A | 8/1993 | Nath et al. | |
| 6,065,255 A | 5/2000 | Stern et al. | |
| 6,269,596 B1 | 8/2001 | Ohtsuka et al. | |
| 6,360,491 B1 | 3/2002 | Ullman | |
| 6,414,237 B1 * | 7/2002 | Boer | 136/251 |
| 6,617,507 B2 | 9/2003 | Mapes et al. | |
| 6,809,253 B2 | 10/2004 | Dinwoodie | |
| 6,968,654 B2 | 11/2005 | Moulder et al. | |
| RE38,988 E | 2/2006 | Dinwoodie | |
| 7,102,074 B2 | 9/2006 | Yen et al. | |
| 7,435,897 B2 | 10/2008 | Russell | |
| 2005/0115176 A1 * | 6/2005 | Russell | 52/220.1 |
| 2006/0053706 A1 | 3/2006 | Russell | |
| 2006/0249198 A1 * | 11/2006 | Rhee | 136/246 |
| 2007/0095388 A1 | 5/2007 | Mergola et al. | |
| 2008/0245399 A1 | 10/2008 | DeLiddo | |

FOREIGN PATENT DOCUMENTS

| | | |
|---|---|---|
| DE | 10224437 | 12/2003 |
| DE | 202006014470 | 1/2007 |
| DE | 202009000030 | 4/2009 |
| EP | 1724843 | 11/2006 |

(Continued)

OTHER PUBLICATIONS

International Search Report and Written Opinion for International Patent Application No. PCT/US2010/022207, Mailed Nov. 25, 2010, 16 pages.

(Continued)

Primary Examiner — Jennifer Michener
Assistant Examiner — Jayne Mershon
(74) Attorney, Agent, or Firm — Blakely Sokoloff Taylor Zafman LLP

(57) ABSTRACT

A photovoltaic array including a plurality of photovoltaic assemblies and a plurality of mounting units. The mounting units each include an elongate rail and a plurality of leg assemblies. The rail is sized and configured to maintain a portion of at least two of the photovoltaic assemblies, with the leg assemblies extending from the rail in a spaced-apart fashion and terminating in a foot for placement against a rooftop structure for minimally penetration installation. Further, at least one of the leg assemblies can include a retractable leg. When the photovoltaic array is installed to a rooftop structure including a membrane intermittently secured to a rooftop deck, the retractable leg accommodates upward billowing of the membrane under windy conditions.

12 Claims, 11 Drawing Sheets

FOREIGN PATENT DOCUMENTS

| | | |
|---|---|---|
| EP | 1826507 | 8/2007 |
| JP | 8284351 | 10/1996 |

OTHER PUBLICATIONS

Professional Solar Products, Inc., "SolarWedge XD Installation Manual", 9 pgs; Oct. 30, 2007.

UNIRAC, "SolarMount—PV's Most Versatile Mounting System", 4 pgs.; © 2007.

UNIRAC, "SunFrame Code-Compliant Installation Manual 809", 24 pgs.; © 2008.

Mayfield, R., "Flat Roof Mounting Systems" SolarPro Feb./Mar. 2009; pp. 46-61; 2009.

* cited by examiner

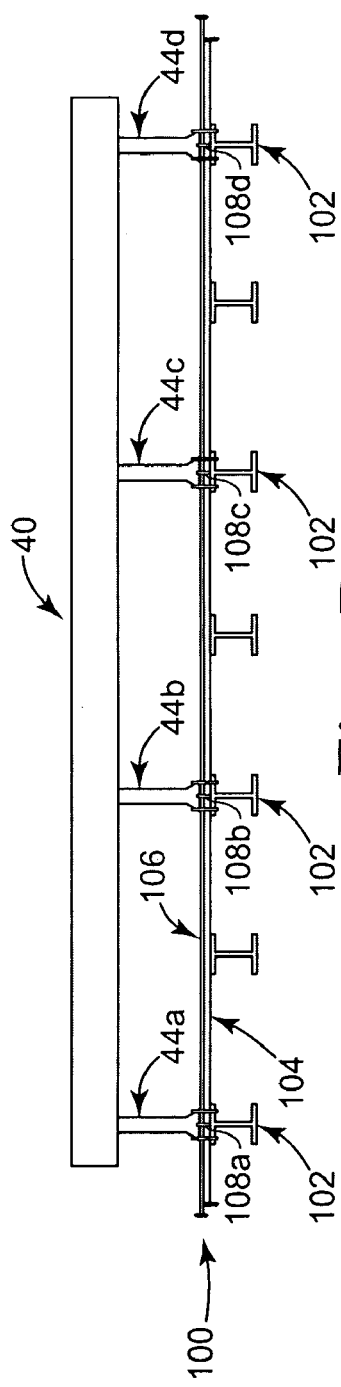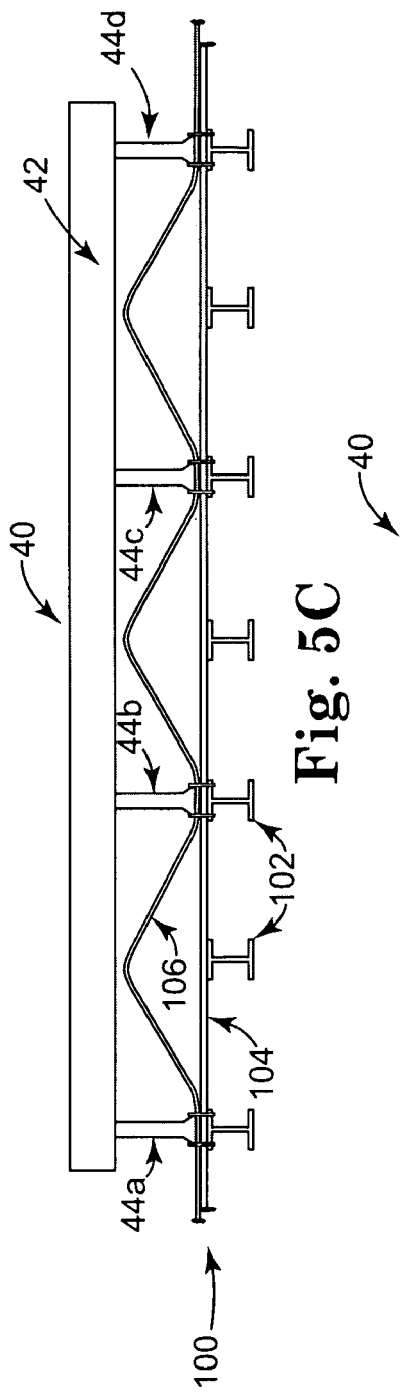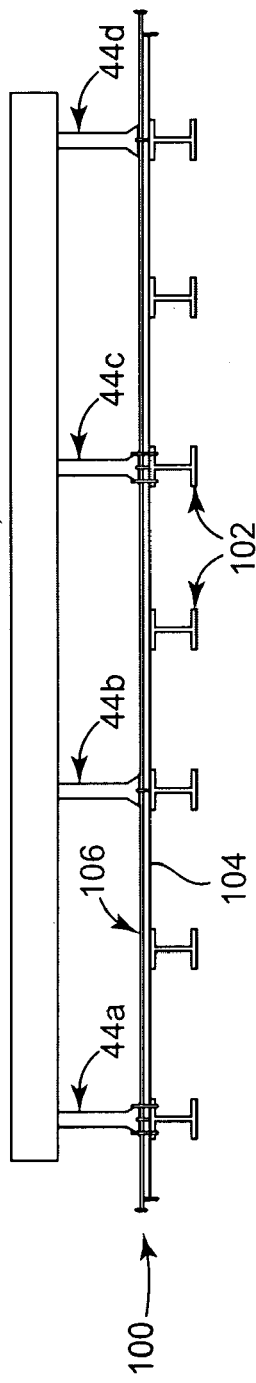

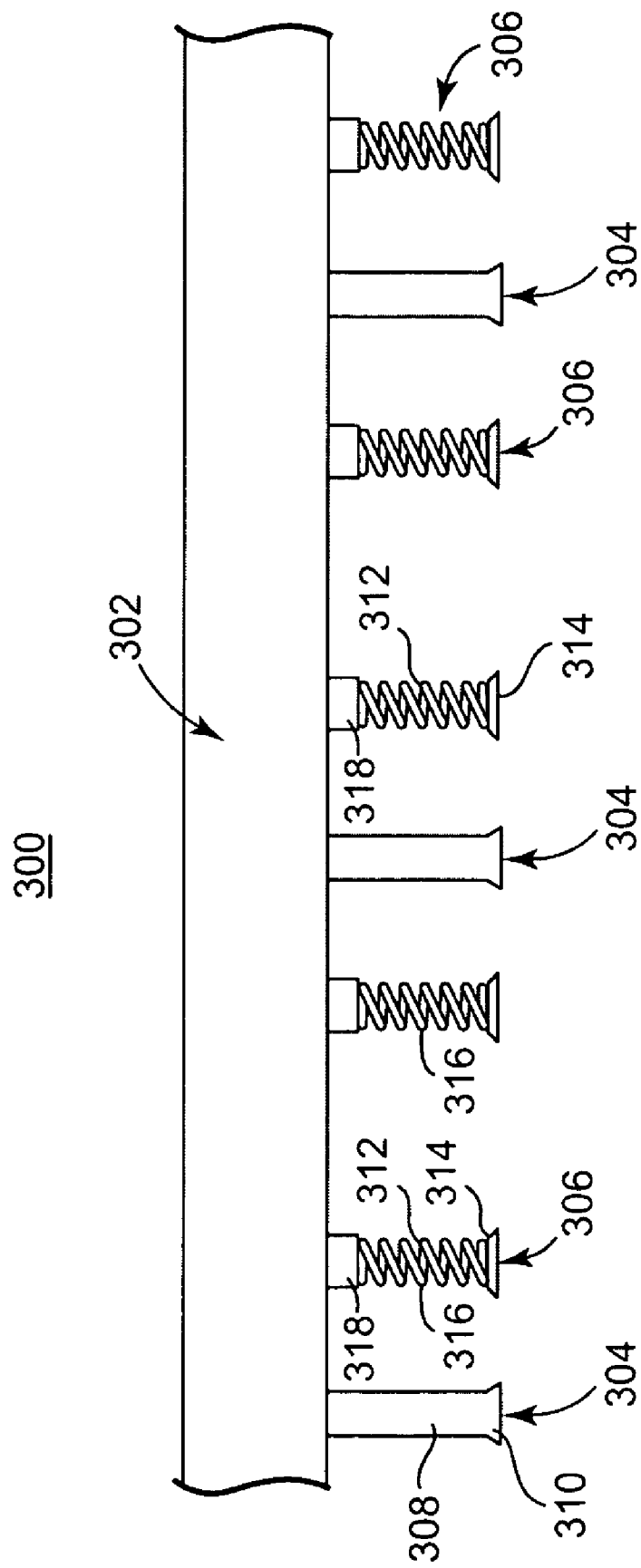

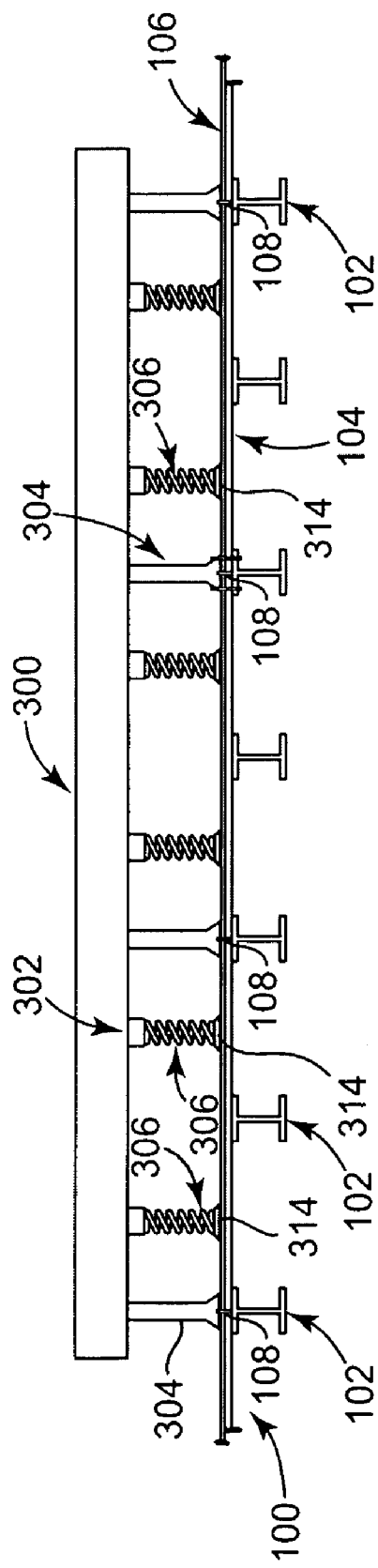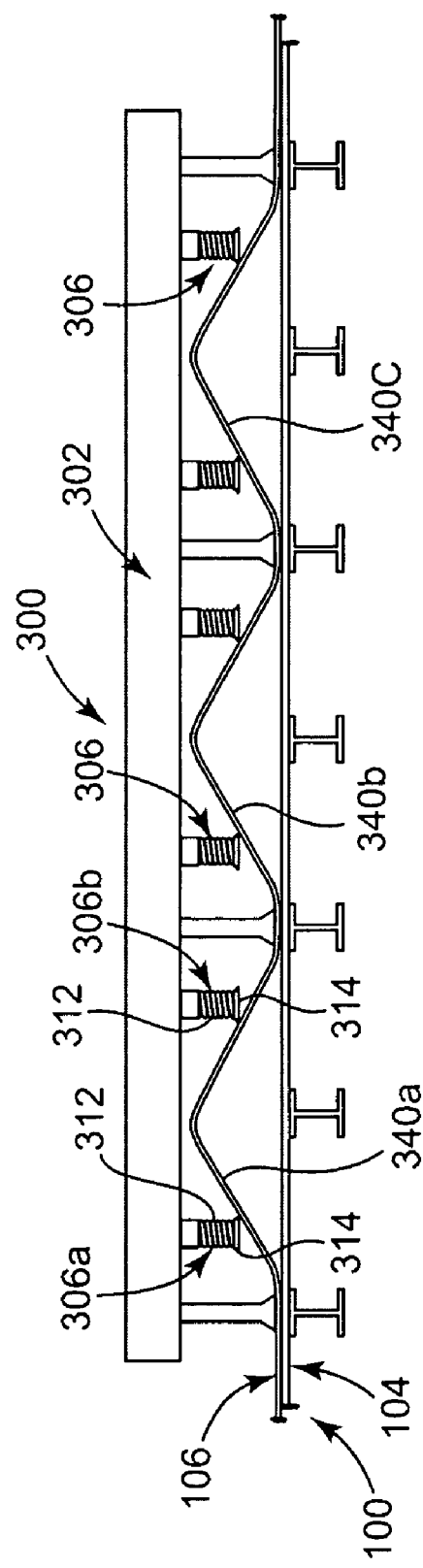

PHOTOVOLTAIC ARRAY WITH MINIMALLY PENETRATING ROOFTOP SUPPORT SYSTEM

STATEMENT REGARDING FEDERALLY SPONSORED RESEARCH OR DEVELOPMENT

This invention was made with Government support under Contract No. DE-FC36-07GO17043 awarded by the United States Department of Energy. The Government has certain rights in this invention.

BACKGROUND

The present disclosure relates to rooftop mount-type photovoltaic arrays. More particularly, it relates to a minimally penetrating support system for installing an array of photovoltaic devices to a rooftop structure, such as a lightweight commercial building.

Solar power has long been viewed as an important alternative energy source. To this end, substantial efforts and investments have been made to develop and improve upon solar energy collection technology, and in particular photovoltaic technology. As the cost of solar cells declines, the non-solar cell components necessary for maintaining a photovoltaic system relative to an installation site begin to dominate the overall system cost. Of particular interest are industrial- or commercial-type applications in which significant amounts of solar energy can be collected, but the corresponding installation/support system costs may negatively impact a potential user's purchasing decision.

Photovoltaic cells are the base technology associated with photovoltaic solar energy collection. Conventionally, a series or array of photovoltaic cells are formed on a single panel or laminate. The resultant photovoltaic laminate can subsequently be assembled to a frame (and other components) to create a photovoltaic module. Alternatively, two or more photovoltaic laminates can be assembled to a common frame. Regardless of whether photovoltaic laminates or photovoltaic module are supplied (collectively referred to as "photovoltaic devices"), most photovoltaic applications entail placing an array of photovoltaic devices at the installation site in a location where sunlight is readily present. This is especially true for commercial or industrial applications in which a relatively large number of photovoltaic devices are desirable for generating substantial amounts of energy, with the rooftop of a commercial building providing a convenient surface at which the photovoltaic devices can be placed. As a point of reference, many commercial buildings have large, flat roofs that are inherently conducive to placement of a photovoltaic array, and are the most efficient use of existing space. While rooftop installation is thus highly viable, the mounting systems employed to maintain the photovoltaic devices must address various constraints. For example, the installed photovoltaic array will be subjected to upward forces (e.g., wind) and downward forces (e.g., mass of the array, snow, etc.); the mounting system must maintain constant connection with the rooftop structure as well as long-term structural integrity under these conditions.

There are two main types of photovoltaic mounting systems used with flat commercial rooftops. Standard rack systems utilize heavy, elongated rails that are anchored to the rooftop by multiple roof penetrations (e.g., bolts driven through or penetrating the rooftop structure). These systems are typically engineered to withstand wind load calculations using standard methods. While available photovoltaic rooftop rack systems are capable of robustly maintaining and supporting numerous photovoltaic devices, the rooftop penetrations are undesirable (e.g., create opportunities for water leakage and otherwise permanently alter the rooftop integrity) and can be quite heavy. Thus, for lightweight buildings, conventional rack systems may not be useable. Conversely, lightweight, non-penetrating rooftop mounting systems have been developed that rely on pressure equalization to avoid overt loads imposed by pressure fluctuations above the building envelope. These non-penetrating systems are typically designed using wind tunnel methods to ensure that high wind speeds do not cause failures.

While the lightweight, non-penetrating photovoltaic array mounting systems enable a significant reduction in the amount of material and labor for installation, as well as very few or no penetrations into the roof envelope, in certain applications, concerns remain. In particular, many light commercial buildings incorporate a rooftop structure having a membrane mechanically attached to an underlying rooftop deck. The membrane is connected to the rooftop deck at limited, spaced-apart pinning points. Pressure fluctuations above the roof will cause the unattached sections of the membrane to flutter or inflate forcefully. Under these circumstances, the billowing membrane can present problems for non-penetrating photovoltaic array mounting systems in that the mounting system connection points, otherwise resting on a billowing membrane, will overtly flex, leading to possible failures. While retrofitted batten bars can be employed to hold the membrane to the rooftop deck at regular intervals, these batten bars are expensive and labor-intensive to install and require many rooftop penetrations, thereby partially or totally defeating the advantages of a "non-penetrating" mounting system.

In light of the above, a need exists for a minimally penetrating photovoltaic rooftop support system that maintains structural integrity in the presence of various forces, including a billowing membrane.

SUMMARY

Some aspects in accordance with the present disclosure relate to a photovoltaic array including a plurality of photovoltaic devices and a plurality of mounting units. The photovoltaic devices each include at least a photovoltaic laminate. The mounting units are provided for supporting the photovoltaic devices relative to a rooftop structure, and each include an elongate rail and a plurality of leg assemblies. The rail is sized and configured to maintain a portion of at least two of the photovoltaic devices, with the leg assemblies extending from the rail in a spaced-apart fashion. Further, each of the leg assemblies terminates in a foot opposite the rail for placement against the rooftop structure. At least one of the leg assemblies includes a retractable leg configured to permit movement of the corresponding foot toward the rail in response to an applied external force. With this construction, then, where the photovoltaic array is installed to a rooftop structure including a membrane intermittently secured to a rooftop deck, the retractable leg accommodates normally occurring upward billowing of the membrane under windy conditions. In some embodiments, the rail is lightweight, and is sized to support a multiplicity of photovoltaic devices in a spaced-apart arrangement that promotes pressure equalization. In other embodiments, at least two of the leg assemblies associated with a mounting unit incorporate rigid legs that can be coupled to the rooftop structure with a penetrating fastener.

Other aspects in accordance with the present disclosure relate to a method for installing a photovoltaic array to a commercial building rooftop structure that includes a membrane coupled to a rooftop deck at intermittent pinning points. The method includes providing a mounting unit including an elongate rail, a plurality of mounting leg assemblies, and at least one supporting leg assembly. Each of the leg assemblies extends from the rail and terminates at a foot opposite the rail. Further, the leg devices are arranged along a length of the rail in a spaced-apart fashion. The mounting unit is arranged relative to the rooftop structure such that each of the feet contacts the membrane and the rail is spaced above the membrane. The foot of each of the mounting leg assemblies is fastened to the rooftop structure with at least one fastener, respectively, penetrating through the membrane and into the rooftop deck. Finally, at least two photovoltaic devices are mounted to the rail such that the mounting unit maintains the photovoltaic devices above, and spaced from, the membrane. With this method, upon final installation, the foot of the at least one supporting leg assembly is not coupled to the rooftop structure by a penetrating fastener. In some embodiments, the mounting unit includes a plurality of supporting leg assemblies, the foot of each of which is not coupled to the rooftop structure by a penetrating fastener. Further, the penetrating fasteners are optionally employed only at pinning point locations of the membrane to the rooftop deck. With these methodologies, then, a minimally penetrating installation is achieved, thereby minimizing potential damage to the rooftop membrane while simultaneously providing adequate support to the photovoltaic devices under both upward force and downward force conditions. In yet other embodiments, one or more of the supporting leg assemblies provided with the mounting unit includes a retractable leg, with the corresponding foot being positioned over an un-pinned region of the membrane. With this installation technique, the retractable supporting leg assembly supports the photovoltaic array relative to downward forces, yet permits or accommodates upward forces, such as those encountered with membrane billowing.

Yet other aspects in accordance with the present disclosure relate to methods for preparing a photovoltaic array for mounting to a commercial building rooftop structure that otherwise includes a membrane coupled to a rooftop deck at intermittent pinning points. The method includes determining pinning distances between adjacent pinning points along the rooftop structure. An elongate rail is formed, configured to receive and maintain a portion of each of a plurality of photovoltaic devices. Two or more leg assemblies are mounted to the rail in a spaced-apart manner, with distances between adjacent leg assemblies corresponding with the determined pinning distances. The so-prepared photovoltaic array is conducive for minimally penetrating installation to the rooftop structure, with the mounting unit leg assemblies being located, and optionally fastened in a penetrating manner, to the rooftop structure only at existing membrane pinning points.

BRIEF DESCRIPTION OF THE DRAWINGS

FIG. 5B illustrates installation of the mounting unit to the rooftop structure of FIG. 5A;

FIG. 5C illustrates the installation of FIG. 5B under windy conditions;

FIG. 5D illustrates an alternative installation of the mounting unit and rooftop structure of FIG. 5A;

FIG. 8A is a simplified side view of another mounting unit in accordance with principles of the present disclosure;

FIG. 8B illustrates installation of the mounting unit of FIG. 8A to the rooftop structure of FIG. 5A; and FIG. 8C illustrates the installation of FIG. 8B under windy conditions.

DETAILED DESCRIPTION

Figure 1:
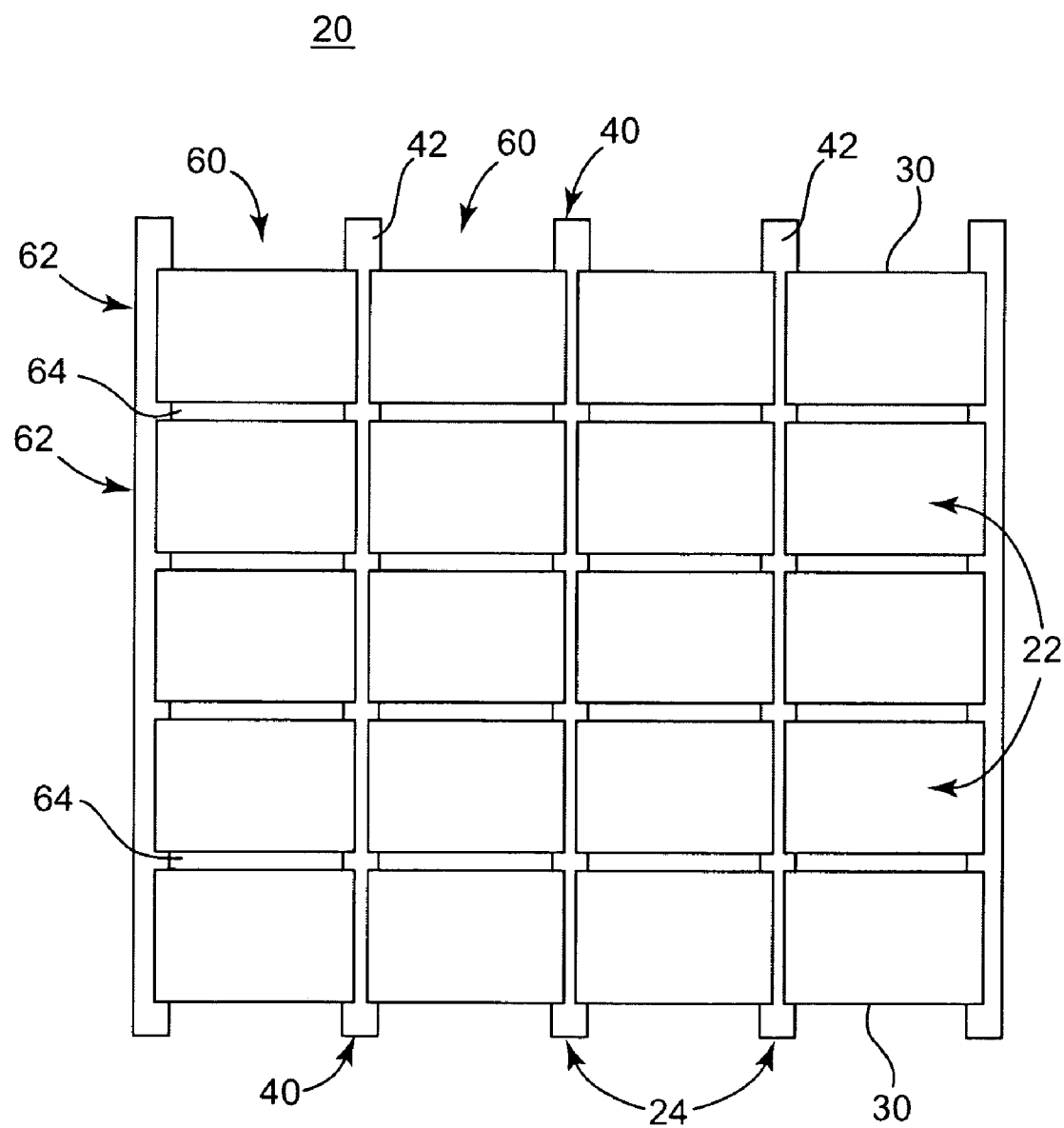
FIG. 1 is a simplified, top plan view of a photovoltaic array in accordance with principles of the present disclosure.

One example of a photovoltaic array 20 in accordance with principles of the present disclosure is shown in FIG. 1. The array 20 is configured, in some embodiments, for installation to a commercial building rooftop structure, and includes a plurality of photovoltaic devices 22 formed and maintained in an array by a support system 24. Details on the various components are provided below. In general terms, however, the support system 24 is lightweight, and facilitates minimally penetrating mounting to a rooftop structure in a manner providing necessary long-term support to the photovoltaic devices 22, as well as accommodating normal rooftop structure variations such as membrane billowing.

The photovoltaic devices 22 can assume a variety of forms that may or may not be implicated by FIG. 1. Each of the photovoltaic devices 22 includes a photovoltaic laminate or panel 30 incorporating an array of photovoltaic cells. A glass laminate may be placed over the photovoltaic cells for environmental protection. In some constructions, the photovoltaic cells advantageously comprise backside-contact cells, such as those of the type available from SunPower Corp., of San Jose, Calif. Other types of photovoltaic cells in any form currently known or in the future developed that are otherwise appropriate for use as a solar voltaic device can also be employed without detracting from the merits of the present disclosure. For example, the photovoltaic cells can incorporate thin film technology, such as silicon thin films, non-silicon devices (e.g., III-V cells including GaAs), etc. Further, although not shown, in some constructions the photovoltaic devices 22 can each include one or more components in addition to the photovoltaic laminate 30, such as wiring or other electrical components (not shown). In yet other constructions, the photovoltaic devices 22 are each provided as photovoltaic modules in which the photovoltaic laminate 30 is mounted to or maintained by a separate frame (i.e., a frame apart from the support system 24).

With the above explanation of the photovoltaic devices 22 in mind, the support system 24 is configured to maintain the photovoltaic devices 22 in the arrayed format shown, and support the photovoltaic devices 22 relative to an installation structure (such as a rooftop structure). The support system 24 includes a plurality of mounting units 40. The mounting units 40 are arranged in a side-by-side fashion, and in some embodiments can be identical. Various constructions of the mounting units 40 contemplated by the present disclosure are provided below. With additional reference to the schematic representation of FIG. 2, however, each of the mounting unit 40 includes a rail 42 and a plurality of leg assemblies 44. The rail 42 is configured to receive and maintain portions of a plurality of the photovoltaic devices 22. The leg assemblies 44 may or may not be identical, but each include a leg 46 extending from the rail 42 and terminating at a foot 48. The leg assemblies 44 serve to maintain the rail 42, and thus the photovoltaic devices 22 (FIG. 1) mounted thereto, at a spaced position relative to the feet 48.

Figure 3A:
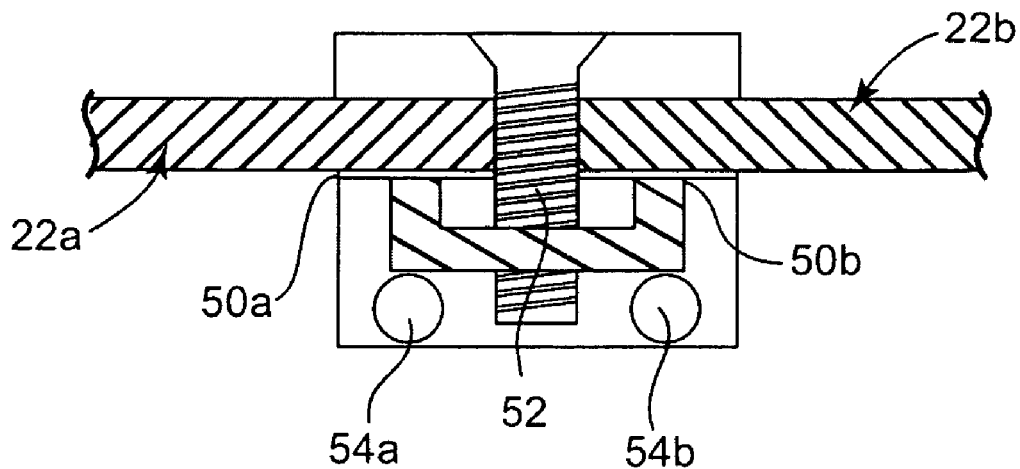
FIG. 3A is a cross-sectional view of one construction of a rail portion of the mounting unit of FIG. 2 and maintaining two photovoltaic devices.
Figure 3B:
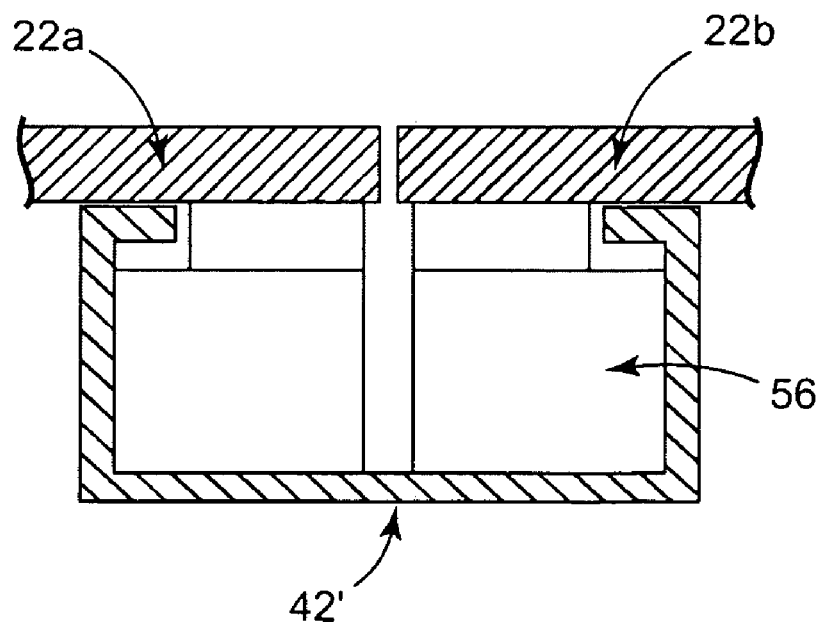
FIG. 3B is a cross-sectional view of an alternative rail useful with the mounting unit of FIG. 2.

The rail 42 provides an elongated body for maintaining several of the photovoltaic devices 22, and can have a length on the order of at least 10 feet, and in some embodiments at least 25 feet, and in yet other embodiments at least 50 feet. Thus, depending upon a size and shape of the photovoltaic devices 22, the rail 42 can maintain a multiplicity of the photovoltaic devices 22 (e.g., ten or more). In this regard, the rail 42 can be formed as a single, homogenous structure or can be comprised of two or more separately formed rail segments that are assembled to one another. Thus, depending upon a size and shape of the photovoltaic devices 22, the rail 42 can maintain a multiplicity of the photovoltaic devices 22 (e.g., ten or more). Further, the rail 42 has a rigid yet lightweight construction, and can be adapted to receive the photovoltaic devices 22 in a variety of fashions. For example, FIG. 3A illustrates one embodiment of the rail 42 maintaining first and second photovoltaic devices 22a, 22b. The rail 42 has a tubular-like construction, forming opposing slots 50a, 50b sized to slidably receive an edge portion of a respective one of the photovoltaic devices 22a, 22b. As a point of reference, the photovoltaic devices 22a, 22b are illustrated as unframed laminates; with modular-type constructions, the slots 50a, 50b are sized and shaped in accordance with the module's frame to facilitate the captured final assembly. In some constructions, the mounting unit 40 further includes a connector 52 that mounts the photovoltaic devices 22a, 22b to the rail 42. In related embodiments, the connector 52 is electrically conductive, with the rail 42 forming wireways 54a, 54b through which string wiring buses (not shown) can extend. FIG. 3B illustrates an alternative construction rail 42' having built-in string wire bus 56.

Returning to FIGS. 1 and 2, the rail 42 can incorporate various other features that facilitate captured mounting of the photovoltaic devices 22 thereto. For example, while the rail 42 is depicted as capturing an edge portion of respective ones of the photovoltaic devices 22, in other embodiments, the rail 42 can be more centrally positioned below a series of the photovoltaic devices 22.

Regardless of an exact cross-sectional shape of the rail 42, the rail 42 is very lightweight as compared to conventional rooftop rack systems. As a point of reference, rooftop rack systems are conventionally designed to withstand a maximum expected uplift load implicated by the intended installation site, as calculated by standard methods. With embodiments of the present disclosure, however, the rail 42 can be lighter than would otherwise be required to fully meet the calculated maximum uplift load for reasons made below. The rail 42 can be formed of aluminum, steel, or other lightweight yet rigid materials. Regardless, with the lightweight construction, the rail 42 presents minimal loading concerns when installed to a rooftop structure.

With specific reference to FIG. 1, the support system 24 adequately supports the photovoltaic devices 22 relative to upward forces while incorporating the lightweight rails 42 by forming the array such that a spacing or gap is provided between adjacent ones of the photovoltaic devices 22. For example, the array of FIG. 1 can be defined as arranging the photovoltaic devices 22 into columns 60 and rows 62. Relative to each of the columns 60, the support system 24 maintains adjacent ones of the photovoltaic devices 22 such that a gap 64 exists. A size of the gap 64 can be selected as a function of the size of the photovoltaic devices 22, but is typically on the order of ⅛ inch-¼ inch. Regardless, the gap 64 allows airflow/pressure from beneath the array to occur, thereby effectuating pressure equalization in the presence of high wind conditions. Alternatively, however, adjacent ones of the photovoltaic devices 22 can be more closely arranged along each of the rails 42. Further, while FIG. 1 illustrates the array 20 as including twenty of the photovoltaic devices 22 (i.e., each of the columns 60 includes five of the photovoltaic devices 22, and each of the rows 62 has four), any other number, either greater or lesser, is also acceptable. Along these same lines, the columns 60 and/or the rows 62 need not be identical. Finally, the rails 42 can be configured to maintain the photovoltaic devices 22 in the horizontal orientation shown (e.g., parallel with a plane of the rail 42), or can incorporate additional components that effectuate a tilted orientation.

Figure 2:
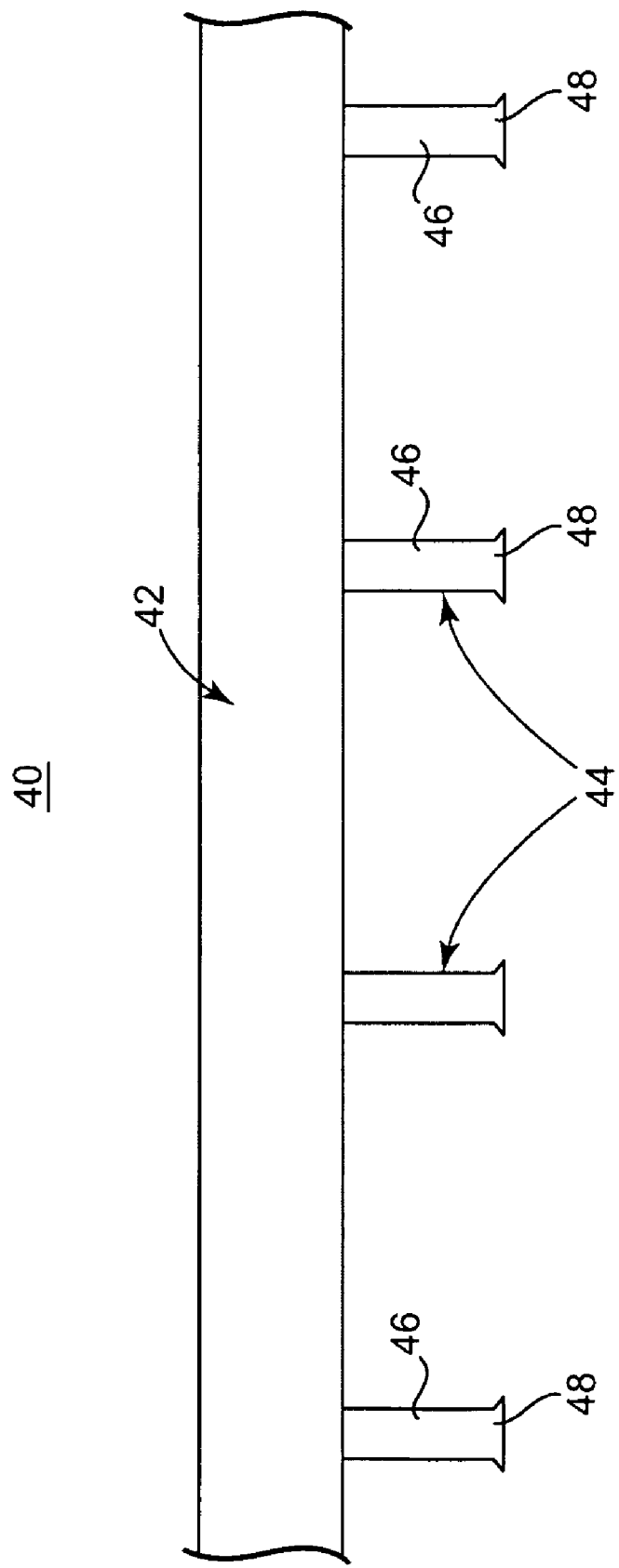
FIG. 2 is a simplified side view of a mounting unit portion of the photovoltaic array of FIG. 1.

With the above understanding of the rails 42 in mind, the leg assemblies 44 can assume any format implicated by FIG. 2. In general terms, the leg assemblies 44 are disposed in a spaced-apart manner along a length of the rail 42, and may or may not be identical. In this regard, a selected construction of each of the leg assemblies 44 is based upon an intended function of the particular leg assembly 44 upon final installation to a rooftop structure. More particularly, each of the leg assemblies 44 will either be directly mounted to the rooftop structure with a penetrating fastener (i.e., a "mounting leg assembly"), or simply placed in contact with the rooftop support structure without a penetrating fastener (i.e., a "supporting leg assembly"). In some embodiments, the leg assemblies 44 are identical, with the functional application being dictated by the installer's decision on whether or not to utilize a penetrating fastener to mount the foot 48 to the rooftop structure (e.g., where a penetrating fastener is employed, the corresponding leg assembly 44 serves as a mounting leg assembly; if no penetrating fastener is utilized, the leg assembly 44 serves as a supporting leg assembly). When adapted for possible use as a mounting leg assembly, then, the leg 46 is a rigid, solid body (e.g., metal) and the foot 48 is configured to promote attachment with one or more fasteners (e.g., bolts), and thus can form one or more bores. Regardless, a mounting leg assembly construction exhibits structural rigidity under expected forces placed onto the mounting unit 40 (e.g., upward and downward forces applied to the rail 42).

Figure 4A:
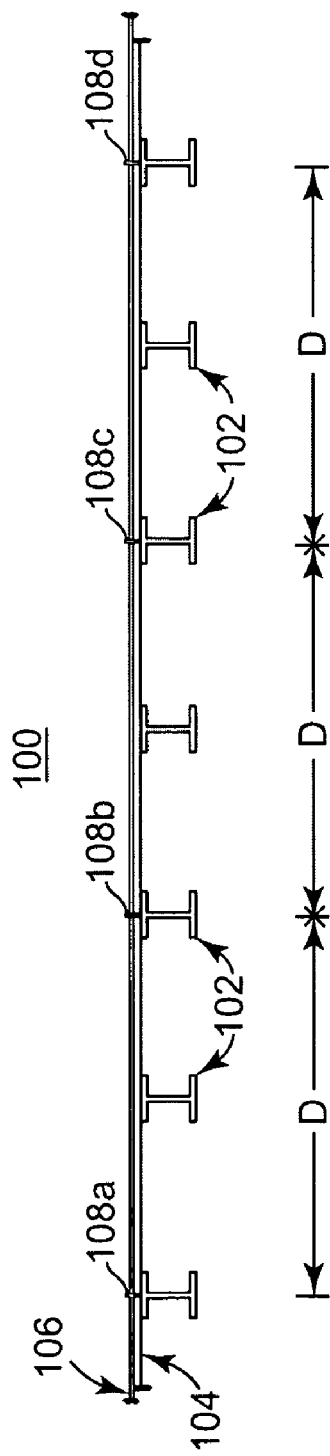
FIG. 4A is a simplified representation of a conventional lightweight building rooftop structure.

Various constructions of the leg assemblies 44 in accordance with the present disclosure are described below. With respect to a basic construction in which all of the leg assemblies 44 are identical and adapted for possible use as a mounting leg assembly, the photovoltaic array 20 can readily be installed to a lightweight commercial rooftop. As a point of reference, FIG. 4A is a simplified representation of a lightweight commercial building rooftop structure 100 that includes support beams 102, a roof deck 104, and a membrane 106. The deck 104 is mounted across the beams 102, and the membrane 106 is secured to an outer surface of the deck 104.

Figure 4B:
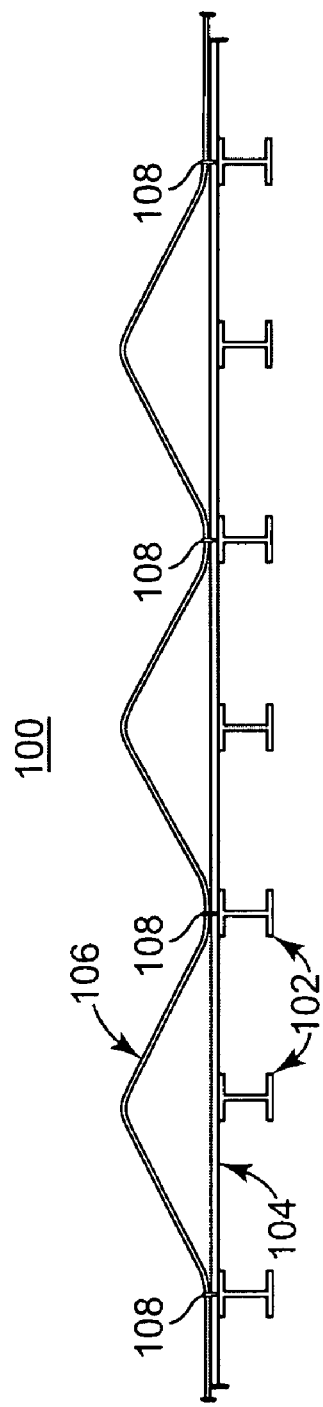
FIG. 4B illustrates billowing of a portion of the support structure of FIG. 4A.

With some building fabrication techniques, the membrane 106 is connected to the deck 104 at spaced-apart pinning locations 108. The connection formed at the pinning locations 108 can be achieved in a variety of fashions, but conventionally entails one or more fasteners (e.g., screws, nails, etc.) piercing through the membrane 106 and penetrating into a corresponding one of the beams 102. The pinning locations 108 can be uniformly or randomly spaced, and represent existing alterations to the rooftop structure 100 prior to installation of the photovoltaic array 20 (FIG. 1). For example, the rooftop structure 100 representation of FIG. 4A includes first-fourth pinning locations 108a-108d. With this but one commonly-employed technique, the pinning locations 108a-108d are equidistantly spaced by a pinning distance D, for example on the order of 10 feet. Even though a sealant is commonly applied, a defect has been created in the membrane 106 at each of the pinning locations 108 independent of installation of the photovoltaic array 20. Further, under windy conditions, the membrane 106 can billow away from the deck 104 between adjacent pinning locations 108, for example as shown in FIG. 4B.

Figure 5A:
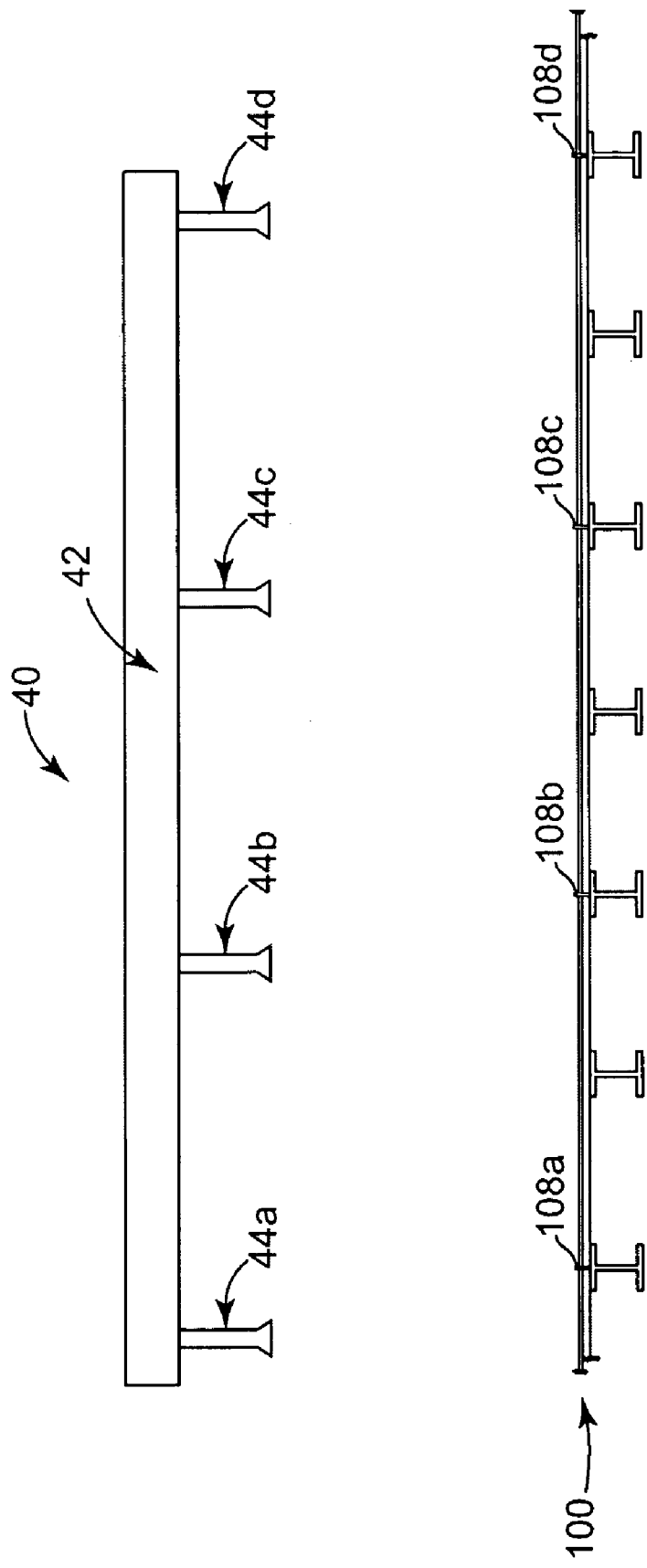
FIG. 5A is an exploded view of the mounting unit of FIG. 2 and the rooftop structure of FIG. 4A.

The photovoltaic array embodiments of the present disclosure minimize the number of additional rooftop penetrations necessary for installation to the rooftop structure 100, and can be configured to accommodate membrane billowing upon final installation. For example, FIG. 5A illustrates the mounting unit 40 prior to installation to the rooftop structure 100. A spacing between adjacent ones of the leg assemblies 44 is formed as a function of a corresponding pinning distance D (FIG. 4A) between adjacent ones of the pinning locations 108. More particularly, the mounting unit 40 is constructed by first evaluating or determining the pinning distance D between adjacent ones of the pinning locations 108. With the above-described pinning distance D in mind, the mounting unit 40 is then constructed to include an appropriate number of the leg assemblies 44 necessary for long-term support of the photovoltaic array (not shown). The number of leg assemblies 44 can be determined for a particular installation site based on calculated forces (e.g., total array mass and expected wind gusts), or can be a predetermined number known to fully support any array under extreme conditions. For ease of explanation, the mounting unit 40 is shown as having four of the leg assemblies 44a-44d, although any other number, either greater or lesser, is equally acceptable. Regardless, a spacing between each of the leg assemblies 44a-44d corresponds with the pinning distance D (e.g., a spacing between the first and second leg assemblies 44a, 44b is 10 feet). With this construction, upon installation of the mounting unit 40 as part of a photovoltaic array to the rooftop structure 100, the leg assemblies 44a-44d are aligned with respective ones of the pinning locations 108a-108d as shown in FIG. 5B. Installation further includes fastening the foot 48 of each of the leg assemblies 44a-44d to the rooftop structure 100 via one or more fasteners (not shown) that penetrate through the membrane 106, and into the deck 104 and a corresponding one of the beams 102.

Upon final installation, the affixed relationship of the leg assemblies 44a-44d to the rooftop structure 100 resists upward forces imparted upon the corresponding photovoltaic array 20 (FIG. 1), as well as provides necessary support against downward forces. While penetrating fasteners are employed, these membrane penetrations are created only at locations where the membrane 106 has already been pierced (i.e., the pinning locations 108a-108d). Thus, the configuration of FIG. 5B serves as a minimally penetrating installation. Further, in windy conditions, the installed mounting unit 40 does not restrict "normal" billowing of the membrane 106 as shown in FIG. 5C. The leg assemblies 44a-44d effectively maintain the rail 42 at a height "above" the maximum billowing height of the membrane 106 such that the billowing membrane 106 does not exert a substantial force upon the rail 42.

While the installation of FIG. 5B entails each of the leg assemblies 44 being mounted to the rooftop structure 100 with a penetrating fastener (and thus all serving as mounting leg assemblies), in other installations, one or more of the leg assemblies 44 need not be directly mounted to the rooftop structure 100. For example, based upon an evaluation of expected wind-caused upward forces that will be experienced by the photovoltaic array 20 (FIG. 1), a determination can be made that direct mounting of only a few (e.g., less than all) of the leg assemblies 44 is necessary to provide requisite long-term support. Thus, FIG. 5D illustrates an alternative installation in which only the first and third leg assemblies 44a, 44c are directly mounted to the rooftop support structure 100 with a penetrating fastener, whereas the second and fourth leg assemblies 44b, 44d simply rest on top of the membrane 106 (and thus serve as supporting leg assemblies).

The above-described feature of some embodiments of the present disclosure in which one or more of the leg assemblies 44 are not directly fastened to the rooftop structure 100 facilities implementation of the rail(s) 42 in a lightweight form (as compared to the weight of the rails utilized with conventional rooftop rack systems). As mentioned above, rooftop rack systems must be designed to withstand large loads (both uplift and downward), per standard calculations; as a result, conventional rooftop rack system rails are heavy to provide attendant mechanical properties. The actual weight of the rails will depend upon such features as the design load, free span, material properties, installed conditions, etc. The rails 42 of the present disclosure are also designed in accordance with these standard factors, but with installations in which one or more of the leg assemblies 44 are not directly fastened to the rooftop structure 100, the rail 42 can be significantly lighter. More particularly, pressure equalization (via gaps between individual photovoltaic devices 22 (FIG. 1)) limits the imposed uplift load applied to the rail 42, and the non-penetrating leg assemblies 44 limit the span lengths which carry downward loads. This, in turn, presents a revised design load calculation factor that result in the rails 42 having a reduced cross-sectional area/moment of inertia, and thus weight.

By way of example, a simplified conventional rooftop rack system for maintaining 3 feet×5 feet photovoltaic devices includes a beam (or rail) supported by rooftop-penetrating supports located at a span of 30 feet (i.e., relative to a length of the beam, the rooftop-penetrating supports are 30 feet apart). Upon assembly to the roof, the beams are placed 5 feet apart and providing shared support of the individual photovoltaic devices. Assuming determined environmental maximum loads of 30 psf uplift and 30 psf downward, the beams must be designed to satisfy the overall maximum load constraints of 30 psf under this example. At 30 psf, a load of 450 lbs/photovoltaic device is present, resulting in a calculated maximum design load on the conventional system rails of 150 lbs/ft. Under these conditions, then, each rail would be designed to withstand a maximum moment of 16,754 ft-lb.

With embodiments of the present disclosure, however, assuming the same design/installation environment constraints as above but with the provision of two, non-fastened leg assemblies 44 located at a span of 10 feet from one another (and equidistantly spaced between the outer, fastened supports otherwise at the 30 foot span as described above), the calculated design load will change. In particular, due to pressure equalization effects, the uplift design load is 5 psf (e.g., with a spaced equalization arrangement of the photovoltaic devices), meaning an uplift load of 75 lbs/photovoltaic device. With each photovoltaic device spanning a distance of 3 feet along the rail 42, a maximum uplift load of 25 lbs/ft on the rail 42 is determined, equating to a maximum moment of 2,792 ft-lb. The downward load of 30 psf must also be considered, but due to the presence of the intermediate, non-fastened leg assemblies 44, results in a maximum moment on the rail 42 of 1,875 ft-lb. Thus, under this example, the rail 42 is designed to meet a maximum moment constraint of 2,792 ft-lb (because the downward maximum moment of 1,875 ft-lb is less than 2,792 ft-lb), a value that is significantly less than the 16,754 ft-lb maximum moment design constraint to be met by the conventional rooftop rack system rail under the identical installation conditions. Thus, the rail 42 in accordance with some embodiments of the present disclosure can be significantly smaller and thus lighter than the conventional rooftop rack system rail. For example, continuing the above, simplified hypothetical, where an identical material and shape is employed for the rails of either the conventional rooftop rack system or the system of the present disclosure (e.g., 6063 T6 aluminum in box beam form), a conventional system rail would have a weight of 6.0 lbs/ft (to meet the 16,754 ft-lb design constraint), whereas the rail 42 in accordance with some embodiments of the present disclosure would have a weight of 2.0 lbs/ft (to meet the 2,792 ft-lb constraint).

Figure 6A:
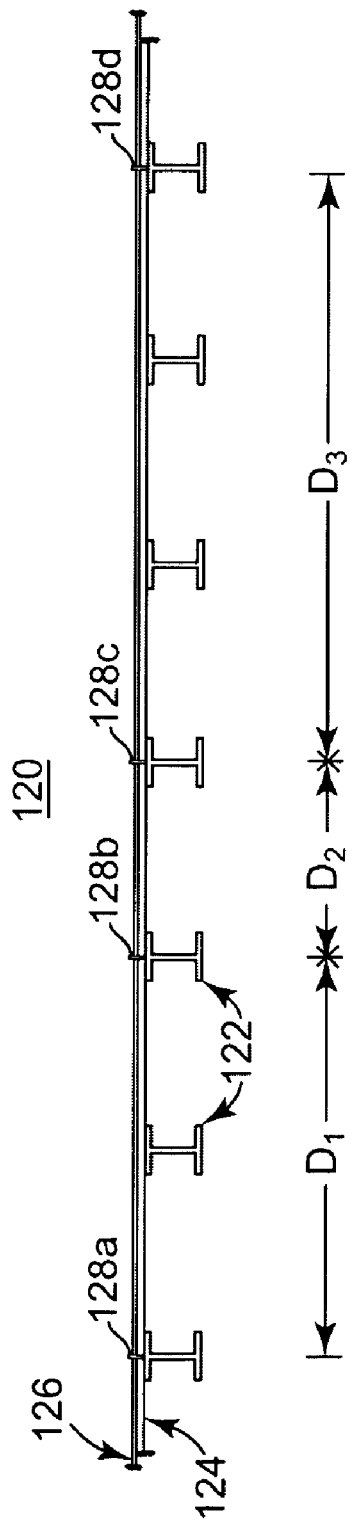
FIG. 6A is a simplified view of another conventional lightweight building rooftop structure.
Figure 6B:
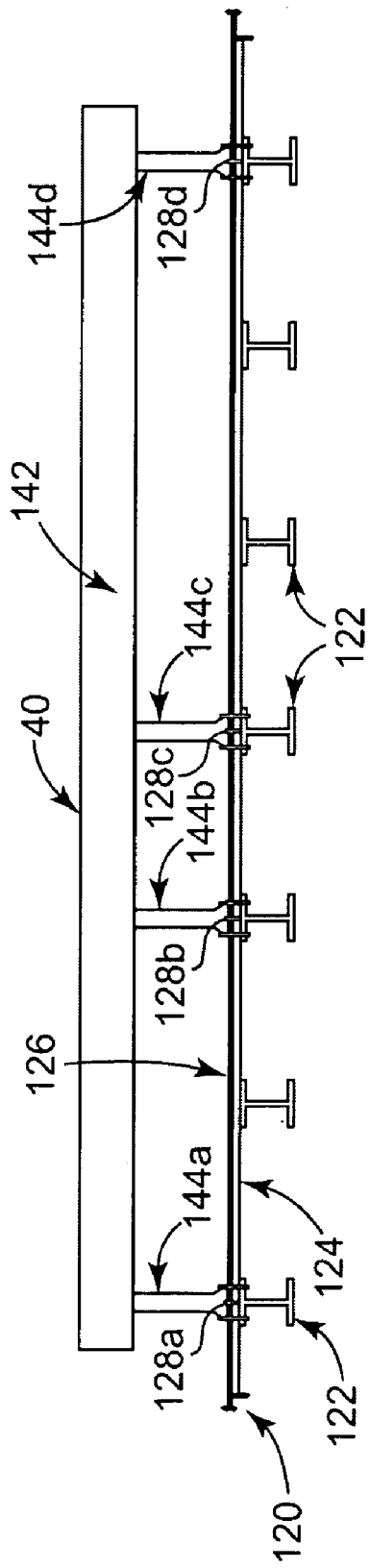
FIG. 6B illustrates installation of a mounting unit in accordance with principles of the present disclosure to the rooftop structure of FIG. 6A.

It will be understood that the rooftop structure 100 described above is but one example of a typical construction. With other buildings, variations will occur. For example, FIG. 6A provides a simplified illustration of another typical rooftop structure 120 that again includes support beams 122, a deck 124, and a membrane 126 secured to the deck 124 at intermittent pinning locations 128a-128d. With the construction of FIG. 6A, however, the pinning locations 128a-128d are non-uniformly spaced. For example, a distance $D_1$ between the first and second pinning locations 128a, 128b is greater than a distance $D_2$ between the second and third pinning locations 128b, 128c. The differing pinning distances $D_1$-$D_3$ are first estimated or determined, and then employed to construct one or more mounting units 140 in accordance with the present disclosure as shown in FIG. 6B. More particularly, the mounting unit 140 includes a rail 142 and a plurality of leg assemblies 144a-144d. The rail 142 and the leg assemblies 144a-144d can assume any of the forms previously described. However, a spacing between adjacent ones of the leg assemblies 144a-144d is selected in accordance with the corresponding pinning distances $D_1$-$D_3$. Thus, for example, a spacing between the first and second leg assemblies 144a-144b corresponds with the pinning distance $D_1$ between the first and second pinning locations 128a, 128b. Upon final installation, then, each of the leg assemblies 144a-144d are affixed to the rooftop structure 120 via fasteners penetrating through the membrane 126 and into the deck 124 (and optionally into a corresponding one of the support beams 122). Alternatively, less than all of the leg assemblies 144a-144d are directly mounted to the rooftop structure 120 (such that some of the leg assemblies 144a-144d serve as mounting leg assemblies while others serve as supporting leg assemblies). Regardless, because the penetrating fasteners are located at previously-imparted piercings through the membrane 126 (i.e., the pinning locations 128a-128d), the resultant installation of the mounting unit 140 is characterized as being minimally penetrating. However, the mounting unit 140 (as well as the photovoltaic devices (not shown) connected thereto) are fully supported relative to the rooftop structure 120, offsetting upward and downward forces as well as permitting billowing of the membrane 126 in a manner that does not interface with the rail 142.

Figure 7A:
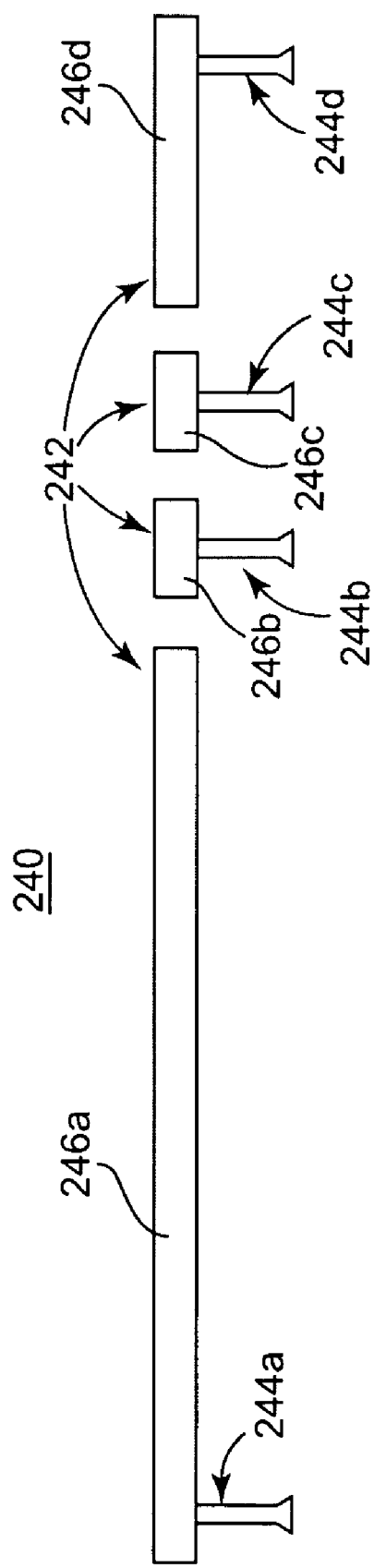
FIG. 7A is a simplified side view of another mounting unit in accordance with principles of the present disclosure.
Figure 7B:
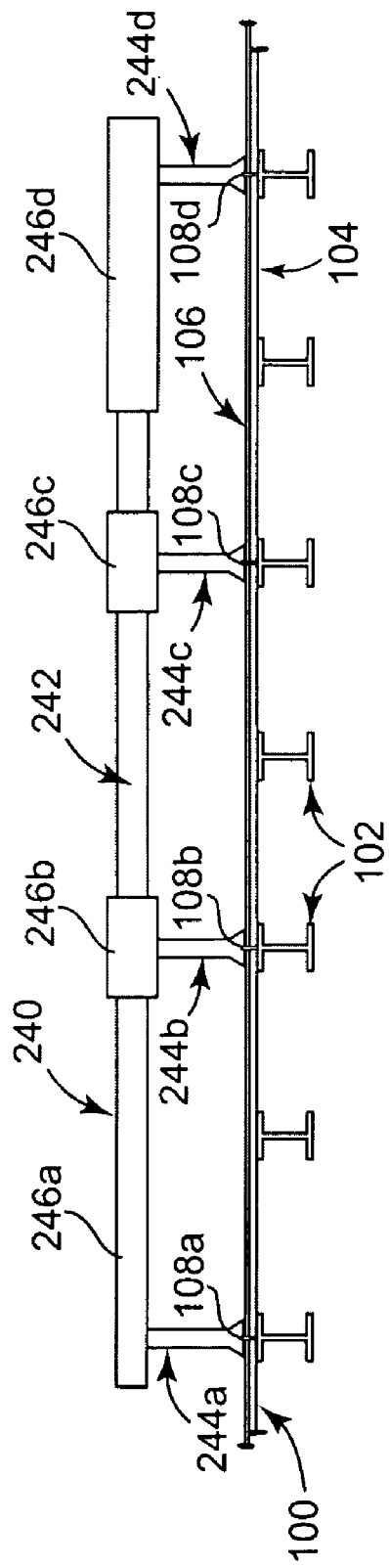
FIG. 7B illustrates installation of the mounting unit of FIG. 7A to the rooftop structure of FIG. 5A.
Figure 7C:
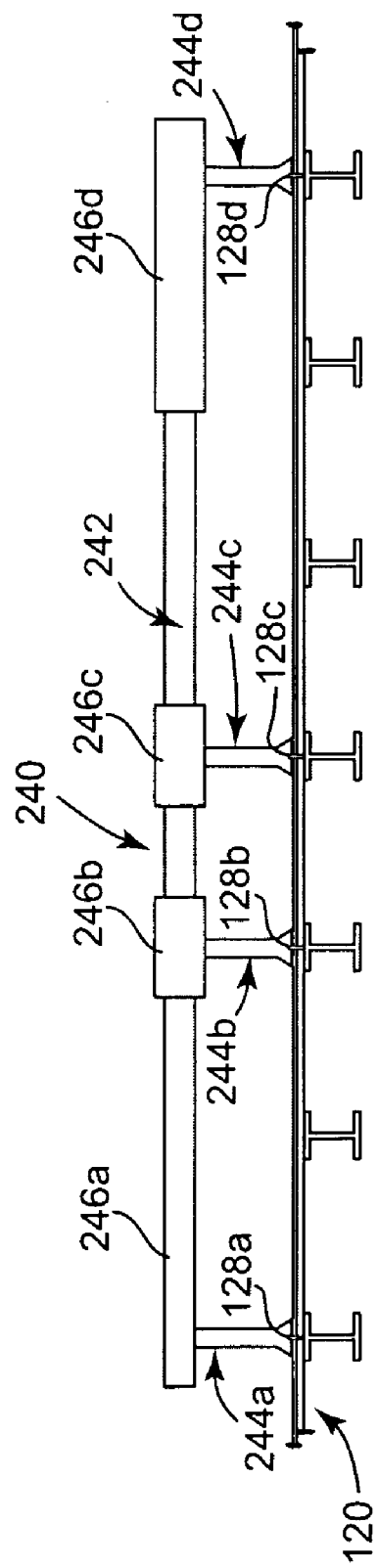
FIG. 7C illustrates installation of the mounting unit of FIG. 7A to the rooftop structure of FIG. 6A.

In some constructions, mounting units in accordance with the present disclosure are pre-fabricated (based upon expected or determined membrane pinning distances) and delivered to the installation site in final form. In other embodiments, however, the present disclosure incorporates one or more features that permit an installer to implement on-site alterations to the mounting unit as a function of the actual membrane pinning distances encountered. For example, FIG. 7A illustrates a portion of another mounting unit 240 in accordance with the present disclosure and useful as part of a photovoltaic array (not shown). The mounting unit 240 is akin to the mounting units previously described, and includes a rail 242 and a plurality of leg assemblies 244. The rail 242 includes two or more rail segments 246 each maintaining a respective one of the leg assemblies 244. The rail segments 246 are configured to be slidably assembled to one another. For example, the first rail segment 246a can serve as a primary rail segment, with the remaining rail segments 246b-246d formed to be slidably received over the first rail segment 246a. With this construction, then, the rail segments 246 can be positioned relative to one another during the installation process to locate the corresponding leg assemblies 244 at desired spacings. For example, FIG. 7B illustrates the mounting unit 240 assembled to the rooftop structure 100, with the rail segments 246 arranged such that the corresponding leg assemblies 244a-244d are aligned with respective ones of the pinning locations 108a-108d. FIG. 7C illustrates the mounting unit 240 installed to the rooftop structure 120. Once again, the rail 242 construction allows an installer to quickly arrange the leg assemblies 244a-244d in general alignment with the membrane pinning locations 128a-128d.

Securement of the rail segments 246 to one another can be achieved in a variety of fashions. For example, mechanical fasteners (not shown) can be employed to affix the second-fourth rail segments 246b-246d to the first rail segment 246a once the desired spacing between the leg assemblies 244 has been achieved. In other embodiments, the rail 242 is provided as a unitary body, with one or more of the leg assemblies 244 being movably assembled thereto (e.g., the leg assemblies 244 can be slidably coupled within a slot formed by the rail 242).

Regardless of the manner in which the leg assemblies are connected to the rail, other embodiments in accordance with the present disclosure provide the mounting unit with differing leg assembly constructions. For example, FIG. 8A illustrates a portion of another mounting unit 300 that includes a rail 302, one or more mounting leg assemblies 304, and one or more supporting leg assemblies 306. The mounting leg assemblies 304 can assume any of the forms previously described, and each include a rigid leg 308 and a foot 310.

The supporting leg assemblies 306 each also include a leg 312 and a foot 314. Unlike the mounting leg assemblies 304, however, the foot 314 associated with the supporting leg assemblies 306 need not be adapted to facilitate use with a separate, penetrating-type fastener. Instead, the supporting leg assembly foot 314 is configured for placement against a rooftop structure surface, with the supporting leg assembly 306 serving to offset downward forces applied to the mounting unit 300. For example, a mass of the rail 302 and the corresponding photovoltaic devices 22 (FIG. 1) exert a downward force on the rail 302 at locations between adjacent ones of the mounting leg assemblies 304. This downward force can be exaggerated with certain installations, such as snowy climates. Under these circumstances, an inherent stiffness of the rail 302 may not be sufficient to fully offset the downward force, with the rail 302 as a result experiencing bowing between the mounting leg assemblies 304. The supporting leg assembly 306, however, serves to offset this potential concern by supporting the rail 302 (via contact with the rooftop structure surface). Thus, in some constructions, regardless of format, each of the leg assemblies 304, 306 have an approximately identical length and extension from the rail 302.

In some constructions, one or more of the supporting leg assemblies 306 are configured to minimize overt resistance to upward movement of the corresponding foot 314 relative to the rail 302. As a point of reference, an upward force may be applied to the foot 314 of each of the supporting leg assemblies 306 by a billowing rooftop membrane. So as to avoid the possibility that the supporting leg assembly 306 will cause the billowing rooftop membrane to tear and/or apply an upward force onto the rail 302, the leg 312 can be retractable such as by incorporating a spring 316. The spring 316 is disposed between the rail 302 and the foot 314. In some embodiments, one or more leg segments 318 can be provided that further stabilize the spring 316 relative to the rail 302 and the foot 314. In addition, the leg 312 can incorporate two or more of the springs 316. Regardless, the spring(s) approximates a constant force spring such that the force exerted by the spring 316 on the foot 314 remains relatively constant even with compression of the spring 316.

Installation of the mounting unit 300 (as part of a photovoltaic array (not shown)) to the rooftop structure 100 is reflected in FIG. 8B and includes affixing the mounting leg assemblies 304 to the rooftop structure 100 via fasteners (not shown) penetrating through the membrane 106. As described above, these penetrating connections are imparted at the previously-made pinning locations 108, and thus do not create substantial defects into the membrane 106. The support leg assemblies 306, however, are not affixed to the rooftop structure 100 by a penetrating fastener. Instead, the foot 314 of each of the supporting leg assemblies 306 simply abuts against the membrane 106.

As shown, the supporting leg assemblies 306 are positioned along the rooftop structure 100 at points between adjacent ones of the pinning locations 108. To this end, the mounting unit 300 can be pre-fabricated based upon expected or estimated membrane pinning distances, and/or the mounting unit 300 can be configured such that the leg assemblies 304, 306 are slidable relative to one another thereby allowing an installer to effectuate desired locations of the leg assemblies 304, 306 during the installation process. Regardless, upon final installation, the mounting leg assemblies 304 and the support leg assemblies 306 serve to reinforce the rail 302 (and the photovoltaic devices (not shown) coupled thereto) against downward forces. That is to say, the leg assemblies 304, 306 fully support the rail 302 relative to the rooftop structure 100 in the presence of excessive downward loads (e.g., snow accumulating on the photovoltaic devices carried by the mounting unit 300). Conversely, resistance to dislodgement of the mounting unit 300 in the presence of an upward force is achieved by the fastened interface of the mounting leg assemblies 304 to the rooftop structure 100.

For example, under windy conditions, the affixed nature of the mounting leg assemblies 304 prevents the mounting unit 300 from movement relative to the rooftop structure 100. Under these same conditions, however, the supporting leg assemblies 406 permit or accommodate expected billowing of the membrane 106 as shown in FIG. 8C. More particularly, FIG. 8C illustrates the membrane 106 billowing at regions 340a-340c. The billowing membrane regions 340a-340c exert an upward force onto the supporting leg assemblies 306 in contact therewith (e.g., the first billowing membrane region 340a exerts an upward force onto the foot 314 of each of the first and second supporting leg assemblies 306a, 306b). Because the leg 312 of each of the supporting leg assemblies 306 is retractable, the supporting leg assemblies 306 retract toward the rail 302 in response to this upward force, thereby permitting the membrane 106 to billow in an expected fashion, imparting minimal, if any, additional upward force onto the rail 302.

The optional, retractable supporting leg assembly embodiments of the present disclosure are useful in many rooftop environments that may or may not include an intermittently affixed, and thus potentially billowing, membrane. In more general terms, the non-penetrating supporting leg assembly embodiments are beneficial with installation environments in which the expected downward forces are greater than the expected upward forces. As indicated above, upward forces imparted upon the installed photovoltaic array 20 (FIG. 1) are typically in the form of wind. Although the above-described gaps or spacings between adjacent ones of the photovoltaic devices 22 (FIG. 1) can effectuate pressure equalization, upward forces will occur, and can be calculated based upon various wind gust parameters associated with the installation site. Conversely, downward forces are primarily a function of the overall mass or weight of the photovoltaic array 20, as well as expected environmental conditions such as rain or snowfall. These expected downward forces can also be calculated. Under circumstances where the calculated, expected downward forces exceed the calculated, expected upward forces, the mounting unit can then be designed to include the supporting leg assemblies described above. Upon final installation, the supporting leg assemblies offset the elevated downward forces, but do not impart any defects into the rooftop structure as penetrating fasteners are not employed.

The photovoltaic array support systems, and related mounting units, of the present disclosure provide marked improvements over previous designs. A photovoltaic array is installed to a rooftop structure in a minimally penetrating form. Necessary stability under upward force conditions is provided, while downward forces (due, for example, to a mass of a photovoltaic array) are minimized. Further, only a minimal number of relatively non-invasive rooftop penetrations are required. Further, the photovoltaic arrays of the present disclosure are highly amenable to lightweight commercial rooftop structures, permitting attendant membrane billowing to occur in a manner that does not affect overall stability of the installation or cause the membrane to tear.

Although the present disclosure has been described with reference to preferred embodiments, workers skilled in the art will recognize that changes can be made in form and detail without departing from the spirit and scope of the present disclosure.

What is claimed is:

1. A photovoltaic array comprising:
   a plurality of photovoltaic assemblies each including a photovoltaic laminate; and
   a plurality of mounting units supporting the photovoltaic assemblies relative to a rooftop structure, each of the mounting units including:
   an elongate rail configured to maintain a portion of at least two of the photovoltaic assemblies,
   a plurality of leg assemblies extending from the rail in a spaced-apart fashion and each terminating in a foot opposite the rail,
   at least one of the leg assemblies includes a retractable leg and a corresponding foot, wherein the retractable supporting leg assembly supports the photovoltaic array relative to downward forces, yet at least partially retracts in response to forces applied to the corresponding foot when in the installed position.

2. The photovoltaic array of claim 1, wherein the photovoltaic array is configured for mounting to a commercial building rooftop structure including a membrane overlying a rooftop deck, the membrane being intermittently connected to the rooftop deck such that an unconnected region of the membrane can billow upwardly from the rooftop deck in response to wind, and further wherein the retractable leg is configured to accommodate billowing of the unconnected region upon final installation of the photovoltaic array to the rooftop structure.

3. The photovoltaic array of claim 1, wherein at least two of the leg assemblies include a rigid leg.

4. The photovoltaic array of claim 3, wherein the retractable leg is located between the rigid legs along a length of the rail.

5. The photovoltaic array of claim 1, wherein the retractable leg includes a spring.

6. The photovoltaic array of claim 1, wherein a plurality of the leg assemblies include a retractable leg.

7. The photovoltaic array of claim 1, wherein a length of each of the legs in extension from the rail, including the retractable leg in an undeflected state, is identical.

8. The photovoltaic array of claim 1, wherein each of the mounting units further includes:

a plurality of fasteners for coupling selective ones of the feet to the rooftop structure in a penetrating fashion;

wherein upon final installation, the foot associated with at least the retractable leg is not coupled to the rooftop structure by a penetrating fastener.

9. The photovoltaic array of claim 1, wherein the rail is lightweight, having a size and weight selected to satisfy a maximum moment constraint determined as the greater of an installation environment uplift load calculation and an installation environment downward load calculation.

10. The photovoltaic array of claim 1, wherein the rail includes:

a first rail segment maintaining one of the leg assemblies otherwise having a rigid leg; and a second rail segment maintaining the leg assembly having the retractable leg;

wherein the first and second rail segments are configured to be selectively assembled to one another.

11. The photovoltaic array of claim 10, wherein the first and second rail segments are configured to be slidably assembled to one another.

12. The photovoltaic array of claim 1, wherein the photovoltaic array includes the mounting unit maintaining a spacing between immediately adjacent photovoltaic assemblies mounted thereto.

* * * * *